June 15, 1943.    J. M. HALL ET AL    2,321,672
CHANGE SPEED MECHANISM
Filed April 6, 1940    2 Sheets-Sheet 1
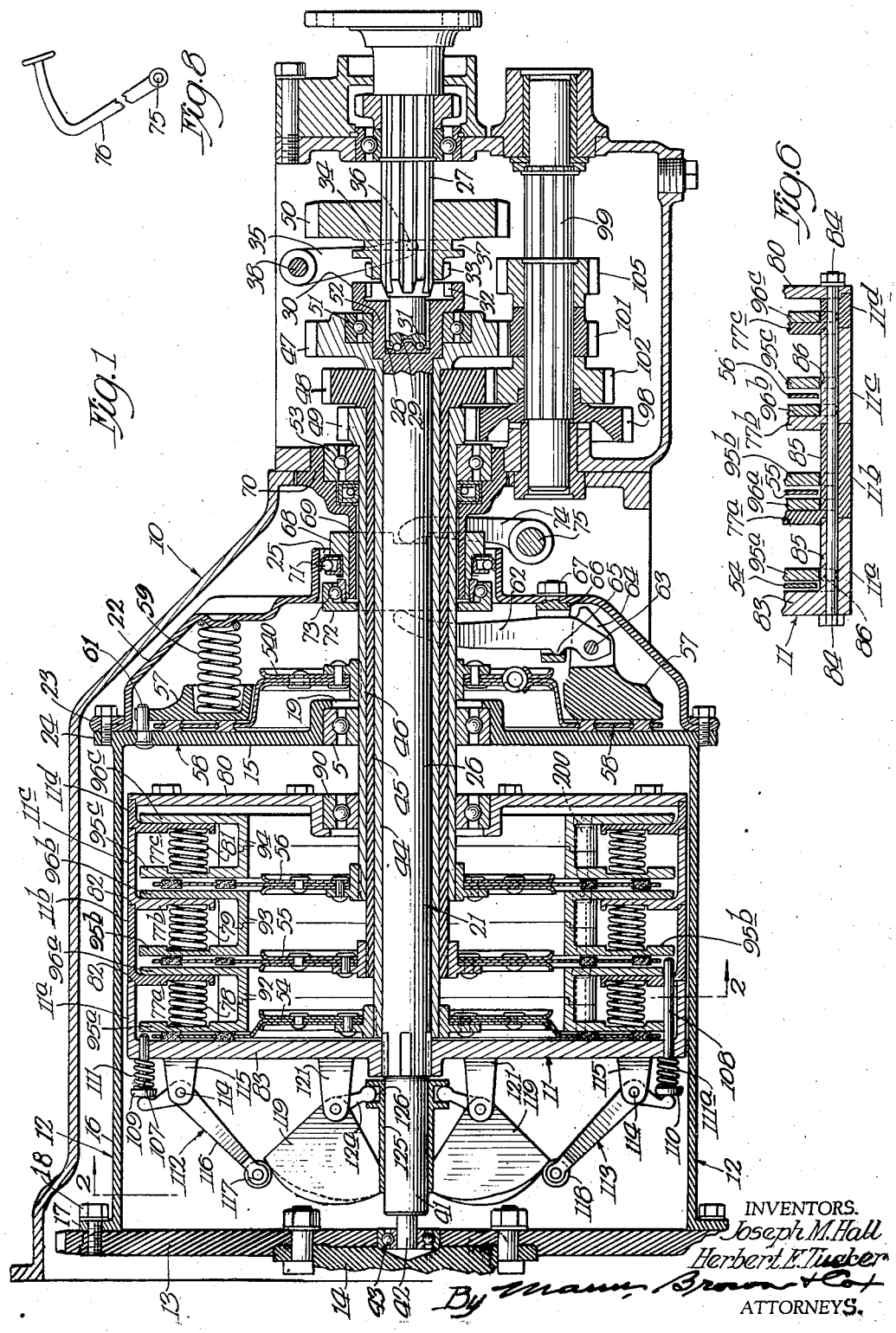
INVENTORS.
Joseph M. Hall
Herbert E. Tucker
By Mann, Brown & Co.
ATTORNEYS.

June 15, 1943.  J. M. HALL ET AL  2,321,672
CHANGE SPEED MECHANISM
Filed April 6, 1940  2 Sheets-Sheet 2
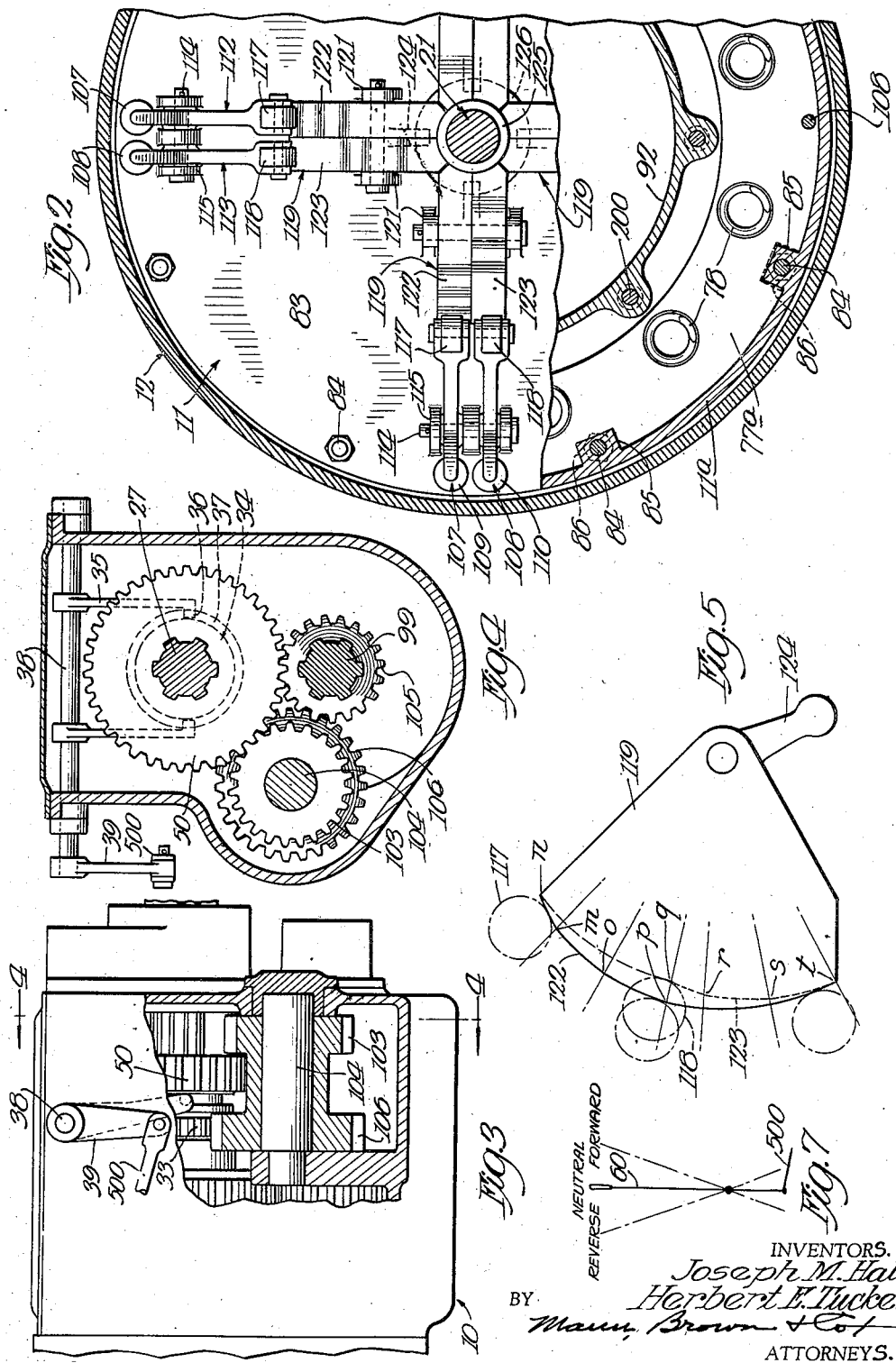
INVENTORS.
Joseph M. Hall
Herbert F. Tucker
BY Mann, Brown & Co.
ATTORNEYS.

Patented June 15, 1943

2,321,672

UNITED STATES PATENT OFFICE 2,321,672

CHANGE SPEED MECHANISM

Joseph M. Hall and Herbert E. Tucker, Chicago, Ill.

Application April 6, 1940, Serial No. 328,184

17 Claims. (Cl. 74—336)

This invention relates to transmission and more particularly to change speed mechanism for automobiles.

One of the objects of the invention is the provision of new and improved means for automatically changing the gear ratios of the transmission mechanism by speed controlled means.

Another object of the invention is the provision of a new and improved change speed mechanism having novel means for automatically changing speed and provided with a service clutch whereby the power shaft may be manually declutched from the operated or driven shaft at all speeds when desired and also provided with a manually operated control lever for changing or reversing the direction of movement of an automobile on which the device is employed.

A still further object of the invention is the provision of a new and improved change speed mechanism having novel speed control means for automatically changing the gear ratios.

Another object of the invention is the provision of an automatically operated change speed mechanism having a multiple plate clutch with novel means for positively releasing the clutch for one speed before effecting clutch operation for the next speed.

A further object of the invention is the provision of a new and improved transmission having novel automatic change speed mechanism that is simple in construction, easily installed, positive and prompt in changing from one speed to another with dragging of the clutch, and that is provided with a manually operated friction clutch and a manually controlled mechanism for neutral, forward and reverse operation.

Other and further objects and advantages of the invention will appear from the following description, taken in connection with the accompanying drawings, in which—

Fig. 1 is a longitudinal section of a transmission and changes speed mechanism;

Fig. 2 is a section on the line 2—2 of Fig. 1, with parts broken away;

Fig. 3 is a side elevation of the gear case, with parts broken away;

Fig. 4 is a section on the line 4—4 of Fig. 3;

Fig. 5 is an enlarged side elevation of one of the centrifugally operated weights showing the cam arrangement;

Fig. 6 is a detailed view of the inner drum member, with parts broken away;

Fig. 7 is a side elevation of the gear shift lever shown more or less diagrammatically; and Fig. 8 is a side elevation of the clutch shown also more or less diagrammatically.

In the application of automatic change speed mechanism to motor vehicles, it is common practice to employ overrunning clutches or brakes in connection with such constructions but such an arrangement necessitates the use of additional mechanism that not only involves additional expense, but, what is more objectionable, it requires additional space within which to house the additional necessary mechanism. The mechanism of the present invention is designed to occupy the same space now occupied by the transmission and change speed mechanism of the conventional automobile.

It is common practice to employ centrifugally operated means for effecting shifting of the gear, but great difficulty has been experienced in that the construction is such that slipping or dragging of the clutch occurs at the critical points of changing from one speed gear ratio to another.

The present invention avoids this difficulty by the provision of centrifugally operated mechanism that moves promptly into the next speed position once it starts to move.

In almost all automobiles having automatic change speed mechanism, no provision is made for a foot operated clutch lever for use with a friction clutch for disconnecting the driving and driven shafts, as is usual in the manually operated gear shift devices.

The present invention not only provides manually operated clutch mechanism but also provides a gear shift lever for forward, neutral or reverse positions of the change speed mechanism, as desired by the driver.

Referring now to the drawings, the reference character 10 designates a gear case which, in the form of the construction shown, is adapted to be employed on an automobile. For simplicity of illustration and description, it will be assumed that the invention is employed in connection with a motor vehicle of which 10 is the conventional gear case.

The case 10 has rotatably mounted therein what will be termed an inner drum member 11 and an outer drum member 12. The drum member 12 is attached directly to what may be termed the flywheel 13 to which is rigidly connected a drive shaft 14 which is attached to, or integrally connected to, the crank shaft of the engine. The drum 12 is a cylindrical member having an open forward end and having its rear end closed by a wall 15. The cylindrical wall 16 of the drum 12 is provided with an outwardly, radially extending flange 17 which is provided with openings for receiving attaching screws 18 threaded in the flywheel adjacent to its periphery for holding the drum 12 to the flywheel 13, as clearly shown in Fig. 1. The rear wall 15 is provided with an axial opening 19 having a ball bearing 5 therein for rotatably mounting the wall 15 on the outer driven sleeve shaft, as will presently appear. Attached to the rear end of the outer drum 12 is a casing 22 having flanges 23 which are adapted to be attached to flanges 24 extending radially outwardly from the wall 15 of the outer drum.

The casing 22 is provided with an axial opening 25 through which the driven shaft 21 extends, as will presently appear. The driven shaft 21 comprises a forward section 26 and a rear section 27. Suitable means are provided for clutching the two sections of the shaft together. In the form of the construction shown, the rear end of the section 26 is provided with a cylindrical recess 28 within which is rotatably mounted the reduced forward end 29 of the shaft section 27. Suitable ball bearings 31 are provided between the end of the reduced section 29 and the bottom of the recess 28.

The rear end of the shaft 26 is provided with an enlarged portion having internal teeth 32 which are adapted to mesh with the teeth 33 on a sliding clutch member 34. The clutch member 34 is slidably mounted on the splined shaft 27 so that when the clutch member 34 is moved forwardly, the teeth 32 and 33 will be engaged so that the two shaft sections will rotate together. This clutch member is rigidly connected to or integral with a shifting gear 50 as clearly shown in Fig. 1.

Any appropriate means may be provided for shifting the clutch member 34. As shown, a yoke 35 is employed for this purpose. This yoke has trunnions 36 which are adapted to engage in a cicular groove 37 in the hub of the clutch member 34. The yoke member 35, Fig. 4, is in the form of two arms or fingers mounted on a shaft 38 and is adapted to be operated by a crank arm 39 to which is attached a link 500, Fig. 3, leading to a change speed gear lever 60, Fig. 7, in the front portion of the automobile, accessible to the driver in the conventional manner or on the steering wheel, as desired.

The jaw clutch 30 is adapted to have three positions—forward, neutral and reverse. The clutch is shown in neutral and when it is moved forward, the teeth 32 will engage the teeth 33 for driving the vehicle forwardly and when it is moved rearwardly from the position shown in Fig. 1, the gear 50 will be moved into mesh with an idler gear for reversing the gear, as will presently be described.

The forward section 26 of the driven shaft 21 is reduced as at 41 and is still further reduced as at 42 to form a journal which engages a ball bearing 43 in the flywheel 13.

The change speed mechanism is arranged to provide three different speed ratios for obtaining low, intermediate and high for forward drive and one speed ratio in reverse. The different forward speed ratios are obtained by providing a plurality of concentric shafts with a separate gear on one end and a clutch disk on the other. The parts are so constructed that all drives, either forward or reverse, are through a master or service clutch 58.

Surrounding the driven shaft section 26 are the driven concentric sleeve shafts 44, 45 and 46. These shafts are provided on their rear ends with gears 47, 48 and 49, respectively. The shaft 44, at its rear end, is enlarged and has therein a ball bearing 51 which is mounted on an enlargement 52 on the forward end of the shaft section 26, Fig. 1. The rear end of the sleeve shaft 46, adjacent to the gear 49, has one member or race of a ball bearing 53 rigidly attached thereto, the outer race of the bearing 53 being secured in a recess in the partition wall 70 in the casing 10. The shafts 44, 45 and 46 have attached to their forward ends, what for convenience of description will be termed driving clutch disks or plates 54, 55 and 56, respectively. The rear end portions of the concentric sleeves or driven shafts 44, 45 and 46 are supported by the ball bearing 53.

The rear end wall 80 of the drum 11 is journaled on the sleeve shaft 46 by means of the ball bearings 90. The master or service clutch 58 is a friction clutch and comprises the rear wall 15 of the outer drum which may be considered a driving disk or clutch plate, a clutch or driven disk or clutch plate 540 splined to the outer sleeve shaft 46, and an annular clutch disk 57. The clutch disk 57 is caused to rotate with the drum 12 by the studs 61 fast on the wall 15 and slidably engaging in slots in said disk.

The disk 540, which is keyed to shaft 46, is adapted to be clamped between the wall 15 and the annular clutch plate 57 to form a driving friction clutch 58. The clutch 58 is the service clutch and is adapted to be released when it is desired to disconnect the engine from the driven shaft while the device is being operated in low, intermediate, high or reverse. It corresponds to the conventional foot operated or service clutch of the standard automobile of the present time.

Suitable means are provided for operating this clutch manually. In the form of the construction shown, the annular clutch member 57 is adapted to be forced forwardly by suitable springs for clamping the disk 540 against the rear end wall 15 of the outer drum member 12 for causing the disk, and with it, the shaft 46, to rotate with the drum 12.

The service clutch 58 is normally held in operating condition by suitable springs 59 which bear, at their rear ends, against the casing 22 and, at their forward ends, against the annular clutch member 57 for clamping the friction or driven disk 540 against the wall 15.

Suitable means are provided for moving the annular clutch member 57 rearwardly for releasing the driven disk 540. As shown, a plurality of levers 62 are provided for this purpose. These levers are symmetrically arranged about the axis of the member 57 and are pivoted as at 63 to lugs 64 carried by the annular clutch member 57. These levers are provided with fulcrum lugs 65 which engage fulcrum members 66 attached as by means of the bolts 67 to the casing 22. The inner ends of the levers 62 are adapted to engage a clutch block 68 slidably mounted on an annular support 69 surrounding the outer sleeve shaft 46. The support 69 is integral with a partition 70 in the casing 10. This block 68 is provided with a thrust plate 72 which is adapted to be engaged by the inner ends of the levers 62. A suitable antifriction thrust bearing 73 is provided between the plate 72 and the block 68. An oil ring 71, sufficiently lubricates the parts.

Appropriate means are provided for shifting the block 68 for operating the clutch. As shown, shift arms 74, mounted on a shaft 75, are provided for this purpose. The shaft 75 is adapted to be operated in any suitable manner by a foot pedal 76, Fig. 8, which is located in the forward part of the automobile in front of the seats, as is usual in such constructions. By pressing forwardly on the pedal 76, the arms 74 will force the block 68 forwardly and this, in turn, will press forwardly the inner ends of the lever 62 for moving the annular clutch member 57 rearwardly for compressing the springs 59 and releasing the clutch plate 540. The manner in which the clutch plate 540 functions in driving the gears will presently appear.

The inner drum member 11 which carries the change speed clutch mechanism will now be described.

The drum member 11 comprises a plurality of annular sections 11a, 11b, 11c and 11d, Figs. 1 and 6. The drum is made in sections for convenience of assembly and each section is provided with inwardly extending apertured driving keys or lugs 85 and the parts are held assembled by bolts 84 extending through said lugs and the end walls 80 and 83 of the drum 11, Fig. 6. The sections 11b, 11c and 11d are provided with inwardly extending integral flanges 77a, 77b and 77c, which are provided with spring seats for receiving the rear ends of springs 78, 79 and 81. Each of these annular sections is provided with a rabbet 82 for receiving the rear edge of the adjacent forward annular section, as clearly shown in Fig. 1 of the drawings. The rear wall 80 of the drum member 11 is provided with a rabbet for receiving the rear edge of the drum section 11d. The drum sections are held in assembled relation by a bolt 84, Figs. 2 and 6, that extends through the end walls 83 and 80 of the drum 11 and through driving lugs 85 integral with the inner surface of the cylindrical sections 11a, 11b and 11c.

The rear end wall of the inner drum 11 is provided with a recess in which the ball bearings 90 are mounted. The inner race of the bearing 90 is rigidly mounted on the sleeve shaft 46 so that the drum is free, under certain conditions, to rotate about the sleeve 46. The forward end wall 83 of the drum member 11 is keyed to the inner driven shaft 21 and rotates therewith. The driving clutch plates 540 and 56 are both rigidly mounted on the sleeve 46 and rotate therewith.

Mounted within the drum 11 and keyed thereto to turn therewith are a plurality of annular driven clutch members or plates 92, 93 and 94. These clutch members or plates have notches or key ways 86, Fig. 2, slidably engaging the lugs or keys 85 integral with said sections and turn therewith. These clutch members or plates are in the form of annular channel plates, that is, they are U-shape in cross-section having front arms or flanges 95a, 95b and 95c, respectively, and rear arms or flanges 96a, 96b and 96c, respectively. For convenience of description, these members may be termed driven clutch plates. These plates are each in two annular sections for purposes of assembly and the sections are held together by bolts 200, Fig. 2.

The driven clutch plates 92, 93 and 94 are intercalated with the driving clutch plates 54, 55 and 56 and the forward flange of each is provided with spring seats which are engaged by the springs 78, 79 and 81, seated against the flanges 77a, 77b and 77c, respectively, which urge the driven clutch plates forwardly. These driven clutch plates 92, 93 and 94 have their rear flanges or arms 96a, 96b and 96c positioned rearwardly of the stationary or rather the fixed flanges 77a, 77b and 77c. The flanges 77b and 77c limit the forward movement of the corresponding clutch plates 93 and 94, the latter being held out of engagement with the corresponding driving clutch disks 55 and 56. The driven clutch plate 92 and the flange 77a are so arranged and spaced that the flange 77a does not limit the forward movement of the channeled clutch plate 92 hence the driving clutch plate 54 is normally clamped between the flange 95a of the driven clutch plate 92 and the end wall or driven clutch plate 83 by the action of the springs 78. This is the condition of this clutch during driving in low speed and the drive may be traced as follows:

From the motor through the power shaft 14, drum 12, clutch 58, outer sleeve driven shaft 46, gear 49 thereon, through a gear 98 keyed to a countershaft 99, then through the gear 101 on the countershaft 99, gear 47 and shaft 44, clutch plate 54 on the shaft 44, then through clutch plate 83, keyed to main driven shaft 21, which rotates shaft 21 at low speed.

In intermediate speed, the channeled clutch member or driven clutch plate 92 is forced rearwardly against the springs 78 by mechanism presently to be described thus first releasing the driving plate 54 and then clamping the driving disk or plate 55 between the flange 96a and the flange 95b against the compression of the springs 79 thus obtaining intermediate speed. The drive then is through the shaft 14, drum 12, clutch 58, shaft 46, gears 49, 98 and gear 102 on the countershaft 99, then through gear 48, shaft 45, driving clutch plate 55, driven clutch plates 92 and 93 which drives the drum 11 and with it the plate or wall 83 keyed to the driven shaft 21.

To obtain high speed, the channeled clutch plate or driven clutch plate 93 is forced rearwardly against the springs 79 for first releasing the driving clutch plate 55 and then to clamp the driving plate 56 against the spring pressed channeled clutch plate 94. The drive is then through the shaft 14, outer drum 12, clutch 58, driving clutch plate 56, driven clutch plates 93 and 94, inner drum 11, driven clutch plate or wall 83 and shaft 21. In all forward speeds, it is necessary to shift the gear 50 forwardly to cause the jaw clutch members 32 and 33 to intermesh. This is done by moving the lever 60 rearwardly into the dotted line position marked forward. The lever is shown in full lines in neutral, that is, in position in which the clutch teeth or jaws 32 and 33 are not engaged. By moving the lever 60 forwardly to dotted line position marked reverse, the gear 50 is shifted into mesh with an idler gear 103 on a jack shaft 104 for obtaining reverse movement of shaft section 27. A gear 105, on the countershaft 99, is in engagement with a gear 106 on the jack shaft 104 and the gears 103 and 106 are integral so that the direction of rotation of the rear portion of the driven shaft is reversed. The reverse drive is possible only at low speed when the driving clutch plate 54 is clamped between the driven clutch plates 83 and 92. The drive is as follows:

From the power shaft through the outer drum 12, clutch 58, shaft 46, gears 49, 98, shaft 99, gears 105, 106, 103, 50 and shaft section 27, Figs. 3 and 4.

Suitable mechanism is provided for shifting the channeled driven clutch plates 92 and 93 for obtaining the change in the gear ratios for securing the different speeds.

In the form of the construction shown, two sets of pins 107 and 108 are employed for this purpose. The pins 107 and 108 extend through and are slidably mounted in the front wall 83 of the drum 11, have heads 109 and 110 on their outer ends and have springs 111 and 111a interposed between the head and wall 83, for normally holding the pins forwardly in inoperative position. The pins 107 are adapted to contact the flange 95a of the driven plate 92 and the pins 108 are long enough to engage the flange 95b of the plate 93 for forcing the same rearwardly.

The means employed for depressing the pins 107 and 108 comprises, in the form of the construction shown, bell crank levers 112 and 113. The short and long pins 107 and 108 are arranged adjacent to each other in pairs and the corresponding bell crank levers 112 and 113 are likewise arranged in pairs, as shown in Fig. 2. Any suitable number of pairs of these devices may be employed, four being shown in the drawings. Each pair of levers is pivotally mounted on a pin or bolt 114 which extends through alined openings in brackets 115 rigidly secured to the plate 83, as more clearly shown in Fig. 2 of the drawings. The long arm 116 of the levers 112 is preferably provided with anti-friction rollers 117 which are adapted to engage a cam for operating the levers. The bell crank lever 113 is similar in construction to the bell crank lever 112 and its long arm is provided with a roller bearing 118 similar to the bearing 117.

Any suitable means may be employed for engaging the bell cranks for operating the same. Preferably, however, these levers are operated by a speed control mechanism in the form of weights 119, one weight for each pair of levers, as shown in Fig. 2. The weights 119 are adapted to be pivoted to bracket arms 121 rigid with and extending forwardly from the end wall 83 of the inner drum. The weights are similar so only one need be described. They are roughly triangular in form having their outer surfaces provided with two cam tracks 122 and 123, one being engaged by the roller 117 of the levers 112 for operating the short pin 107 and the other is adapted to be engaged by the roller 118 of the bell crank 113 which is adapted to operate the longer pins 108. In order to synchronize the swinging movements of the weights, a collar 125 having an annular recess 126 is slidably mounted on the reduced end 41 of the driven shaft 26. Each weight is provided with a projection 124. These projections extend, when in operative position, rearwardly and inwardly and the ends terminate in knoblike members that engage in an annular recess 126 of the collar 125. It will thus be seen that this arrangement will cause the weights to swing outward evenly and simultaneously.

The arrangement of the bell crank levers 112 and 113 and the curvature of the cam surfaces 122 and 123 are such that the compression of the clutch springs will cause sufficient pressure of the rollers 117 and 118 on the cam surfaces to move the weights 119 inwardly toward the shaft 26 in opposition to the centrifugal force of the weights. During the initial rotation of the inner drum, the springs 78 yieldingly resist, through the crank arms 112, the centrifugal movement of the weights. Then, as the speed increases and the speed mechanism operates to change the speed ratio to intermediate, the set of springs 79 are brought into action. The cam surfaces 122 and 123 are so constructed that the weights will be held from moving from one change speed position to the next succeeding one until the centrifugal force exceeds a predetermined amount and then will move with an abrupt or snappy movement to the next position. In order to accomplish this result, each cam surface has portions thereof arranged at angles to each other; that is, the track, between certain points, will be on different curves.

Each track will have four zones. The track 122, which controls the operation of the driven clutch plate 92, has its first zone arranged at what will be termed a steep angle, the second zone at a moderate angle, the third is at what will be termed a flat angle and the fourth is on a radius; that is, the curve is such that the pressure of the roller 117 on the cam surface will be radial to the curve whereby no camming action will occur when the roller 117 moves along the same. In other words, the first three zones function as cams to first move the driven plate away from the driving clutch plate 54 and then almost instantaneously, and with a snappy action, into contact with the clutch plate 55 for obtaining intermediate speed. The other track 123 also has four zones but the first zone is radial and extends the length of the first three zones of the track 122. The second zone of this track is steep, the third a moderate angle, and the fourth and last a flat angle. All four sections of both tracks are arranged on curves.

Referring now to Fig. 5 in which the weight 119 is shown on an enlarged scale, more or less diagrammatically, the track 122 is shown in full lines and the track 123 in dotted lines. Consider first the track 122 which is engaged by the roller 117. During the initial operation of the car, the roller is in the first zone; i. e., it is on the curve shown between the lines m and n in Fig. 5. In this zone, the curvature forms a comparatively steep angle for restraining the weight 119 from moving outwardly by centrifugal action. The length of the track 122 between the lines m and o; that is, the second zone, is on a moderate angle not as steep as the angle made by the curved track portion between m and n. The portion between o and p is at what will be termed a flat angle; that is, its camming action is still less than in the second zone. The remainder of the track from the line p to t is on a radius taken from the pivotal axis about which the weight rotates. As a result of this arrangement, the roller 117 retains the weight in the position shown in Figs. 1 and 5 during the initial operation of the vehicle and until the certrifugal action of the weight builds up to such an extent as to cause the roller 117 to travel up over the steep angle; that is, the "hump" and onto the moderate angle. Since the camming action is only moderate, the roller will pass almost instantaneously over the moderate angle onto the flat angle of the third zone. In moving over the first and second zones, the driven clutch plate 92 will be moved to the right to first release the driving clutch plate 54 and then clamp the clutch plate 55. This entire movement is almost instantaneously accomplished. The camming action in the third zone merely forces the clutch plate further to the right against the further compression of the springs 78 and 79.

Since the angle of the track between m and o is less than between m and n, and the portion between o and p has a still smaller angle and a less camming action, the roller 117 will move rapidly over the surface 122 onto the radial surface between the point p and the end of the track. The roller 117 is forced outwardly still further while passing over the cam surface between m and o and between o and p for forcing the clutch plate against the clutch plate 55 for setting the clutch for intermediate speed. In the meantime, the companion roller 118 on the bell crank arm 113 will have moved along the non-camming track 123 until it reaches the dotted line position shown in Fig. 5, which is just at the time the roller 117 is ready to move onto the radial track. Up to this point, the track 123 is concentric with the pivotal axis of the weight and exerts no camming action but when it reaches the point q, shown in Fig. 5, the weight will be restrained from moving further outward by a steep angle formed on the track between q and r, the angularity of the track between q and r, being similar to that between m and n, will form a kind of shoulder against which the roller 113 engages. That portion of the track 123 between the lines r and s is less abrupt or steep than that portion between q and r; that is, it is at a moderate angle and corresponds to the portion of the track 122 between the lines m and o. The remainder of the track beyond the point s; that is, between the lines s and t, is at a flat angle corresponding to the portion of the track 122 between the lines o and p.

In the operation of the arm 113, the roller will not move from the position shown in Fig. 5 until the speed of the vehicle rises somewhat above that required for high speed and then will suddenly move up the incline of the angle between q and r and between r and s for releasing the driving clutch plate 55 and for clamping the clutch plate 56 in a manner described with reference to the clutch plates 54 and 55.

On deceleration from high to intermediate, the roller 118, being on the flat angle between s and t and urged by the springs 79 and 81, tends to force the weights back against the centrifugal force thereof. As soon as these forces become unbalanced in favor of the springs, then the roller 118 moves from the flat angle onto the steeper cam portions of the track and then will run down these surfaces with a bang to the concentric surface of the path and simultaneously declutch the driving plate 56 and clutch the intermediate driving clutch plate 55 for obtaining intermediate speed. The same is repeated for the roller 117 for changing to low speed. While the rollers are described as traveling over the cam surfaces, it is understood that this description is employed for simplicity in explaining the camming action and that, as a matter of fact, the weights with the camming surfaces turn under the rollers.

It will thus be seen that the service clutch may be manually operated to disconnect the driving shaft at all speeds; that there are no overrunning clutches or brakes; that the gears for forward drive are constantly in mesh during the operation of the car; and, that there is no dragging of the clutch when changing from one speed to the next.

The oil rings and other devices for lubricating the mechanism have been omitted for the most part for the sake of clearness. Any of the conventional oiling mechanisms may be employed for this purpose.

It is thought from the foregoing, taken in connection with the accompanying drawings, that the construction and operation of our device will be apparent to those skilled in the art and that changes in size, shape, proportion and detail may be made without departing from the spirit and scope of the appended claims.

We claim as our invention:

1. In a change speed mechanism, a driving shaft, a driven shaft, a plurality of concentrically arranged auxiliary driven shafts, change speed means for operating said driven shaft from said driving shaft through each of said auxiliary shafts, said means comprising a service clutch for operatively disconnecting the driving shaft from the driven shaft at any speed ratio, at will, a spring pressed clutch for each of said driven shafts, speed controlled means for operating said last-named clutches progressively as the speed of the driven shaft increases, said last-named means comprising a plurality of sets of pivoted weights rotatable about said driven shaft, a set of curved roller tracks on the periphery of each of said weights, each roller track having a cam zone at a relative steep angle, an adjacent cam zone at a moderate angle and a zone concentric with the pivot of said weight, the cam zone of one being opposite the concentric zone of the adjacent track, means engaging said tracks and so constructed as to progressively operate said spring pressed clutches for selectively driving said driven shaft through said auxiliary shafts for obtaining different speed ratios between said driving and driven shafts.

2. In a change speed mechanism, a plurality of driving clutch plates, a plurality of driven channeled clutch plates intercalated with said driving clutch plates, abutment members between the flanges of each channel plate, springs engaging each abutment and the forward flange of said channel driven plate for forcing said channeled driven plates forwardly, means for moving said channeled driven plates rearwardly to first release a driving clutch plate and for clamping the next adjacent driving clutch plate, said last-named means comprising pivoted weights having cam surfaces thereon, and bell crank levers engaging said cam surfaces, each of said surfaces having a steep angle, a moderate angle, a flat angle, and a surface concentric with the pivot of said weight.

3. A weight for use on a change speed mechanism comprising a triangular mass of metal having a curved periphery, means for pivotally supporting said weight from one apex, a pair of cam tracks on the periphery and arranged side by side, the forward zone of one of said tracks having a steep angle, the next zone a moderate angle, the third zone a flat angle, and the remainder of the track being concentric with the pivot of said weight and the other of said tracks having its first zone extending alongside the first, second and third zones of the first-named track and having its steep angle zone following its concentric zone.

4. In a motor vehicle transmission mechanism, a driving shaft, a driven shaft, change speed mechanism including driving clutch members and spring pressed shiftable driven clutch members for changing the speed ratio between said shafts, said mechanism comprising pivoted centrifugally operated weights carried by said driven shaft and each having cam surfaces thereon, and levers engaging said surfaces for shifting said driven clutch members for changing said ratio, each weight having curved cam surfaces in which segments of the curve are at different angles.

5. In a change speed device for motor vehicles, a driving shaft, a driven shaft, change speed mechanism between said shafts, said mechanism comprising spring pressed clutch members, centrifugally operated weight members having cam surfaces thereon and elements controlled by said weights and cams for operating said clutch members for progressively changing the speed ratio of said driving and driven shafts as the speed of the latter increases, said weights each having cam sectional surfaces thereon, each section of each surface being arranged at an angle to the remaining sections, the first section being the more abrupt whereby changing the speed will be prompt and without slipping of clutch plates, and a manually operated service clutch for operatively disconnecting said driving and driven clutch, at will.

6. In a change speed device for motor vehicles, a driving shaft, a driven shaft, change speed mechanism between said shafts, said mechanism comprising spring pressed clutch members, centrifugally operated weight members having cam surfaces thereon and elements controlled by said weights and cams for operating said clutch members for progressively changing the speed ratio of said driving and driven shafts as the speed of the latter increases, said clutch members comprising driving disks and channeled driven disks intercalated between said driving disks, means for forcing the forward arm of the channeled disk against the forward of said driving disks for causing the two to rotate together, and means for moving said channeled disk rearwardly for releasing the forward disk and clamping the second driving disk with the rear arm of the channeled disk for causing the two to rotate together for obtaining a different speed ratio between the driving and driven shafts.

7. In a change speed mechanism for use on motor vehicles, a driving shaft, a sectional driven shaft comprising a front and a rear section, manually operated clutch means for connecting the sections of said driven shaft together, one of said sections having concentric sleeve members thereon, a gear carried by each sleeve member, a countershaft, gears on said countershaft permanently meshing with the gears on said sleeve members, an inner drum member rotatable with the forward section of said driven shaft, an outer drum member rotatable with said driving shaft, manually controlled clutch mechanism for driving the outermost sleeve member from said outer drum member, clutch mechanism for driving said driven shaft from said sleeve members at different speed ratios, said means comprising driven clutch elements movable with said inner drum and driving clutch elements movable with said sleeve members, respectively, and centrifugally controlled mechanically actuated mechanism for selectively driving said sectional driven shaft from said sleeve members at different speed ratios.

8. In a change speed device, a driving shaft, a driven shaft, change speed mechanism for driving said driven shaft from said driving shaft at a plurality of speeds, said mechanism comprising a plurality of auxiliary shafts each having a gear on one end and a clutch plate member on the other, friction clutch elements, means for causing said clutch elements to rotate with said driven shaft, a countershaft, gears thereon rotatable therewith and in permanent mesh with the gears on said auxiliary shafts, said clutch elements having channels in their periphery, means for moving said clutch elements laterally for selectively frictionally engaging said clutch plate members, means for biasing said clutch elements toward said clutch plate members, and means for selectively disengaging the clutch elements and members for obtaining one speed immediately before engaging those for the next higher or lower speed.

9. In a change speed device, a drive shaft, a driven shaft, change speed mechanism for driving said driven shaft from said driving shaft, said mechanism comprising a drum member rotatable with said driven shaft, a plurality of auxiliary shafts extending into said drum, gear mechanism, multi-clutch within said drum for selectively driving said driven shaft from said auxiliary shafts through said gear mechanism, said mechanism comprising rigid anchor plates within said drum, channeled clutch plates movable laterally and rotatable with said drum, cooperating clutch disks intercalated with said clutch plates and an end wall of said drum and movable with said driven and auxiliary shafts, respectively, springs for normally forcing said channeled clutch plates into contact with said anchor plates, and means for progressively moving said channel plates laterally for releasing one clutch disk and immediately thereafter frictionally engaging the next adjacent disk for obtaining the next higher or next lower speed ratio of said driving and driven shafts.

10. In a change speed device for use in motor vehicles, the combination of driving and driven shafts, change speed mechanism between said shafts, said mechanism comprising hollow shafts telescoping said driven shaft, gears having different numbers of gear teeth on one end of each of said hollow shafts, a plurality of driving clutch members carried by said hollow shafts, a plurality of driven clutch members carried by said driven shaft cooperating with said driving clutch members for selectively operating said driven shaft from said sleeve shafts, a countershaft, gears on said countershaft meshing with said first-named gears, a single set of centrifugally operated weight members having cam faces and means cooperating with said cams and engaging certain of said clutch members for mechanically actuating said clutch members for driving said driven shaft from said driving shaft at different speed ratios without the use of overrunning clutches.

11. In a change speed device, a driving shaft, a sectional driven shaft, a plurality of sleeve shafts telescoped over one section of said driven shaft, a gear on one end of each of said sleeve shafts, a clutch disk on the other end of each sleeve shaft, change speed mechanism including a countershaft and pinion thereon meshing with said gears for driving the driven shaft at the same speed or a plurality of different speeds than said driving shaft, dry clutch elements associated with one section of the driven shaft and normally rotatable therewith and selectively engageable by said clutch disks for rotating said driven shaft, means centrifugally operated for automatically operating said clutch elements for changing the speed ratio between said shafts through all of said speeds from the lowest to the highest, and changing from a lower to the next higher speed independently of brakes or overrunning clutches when the speed of the driven shaft exceeds a predetermined limit, and a manually controlled clutch for disconnecting said driven shaft from said driving shaft under all speed conditions of said driven shaft either forwardly or rearwardly.

12. In a change speed device, a driving shaft, a driven shaft, a plurality of auxiliary driven shafts, change speed mechanism between said shafts, said mechanism including a plurality of clutch plates movable with said driven shafts and gears in permanent mesh for driving said driven shaft in a plurality of forward speeds, speed controlled means comprising pivoted centrifugally operated weights having cam faces, means engaging certain of said clutch plates and the cam faces of said weights for automatically changing the ratio of rotation of said driving and driven shafts when the speed of said driven shaft rises above, or falls below, a predetermined amount, and means including a manually operated friction clutch for disconnecting the driving and driven shafts at will.

13. In a change speed device, a driving shaft, a driven shaft, a plurality of concentric sleeve shafts, change speed mechanism for driving said driven shaft from said driving shaft, said mechanism comprising an outer rotatable member movable with the driving shaft, an inner rotatable member rotatable with the driven shaft, a main service clutch between the outer of said sleeve shafts and said outer rotatable member, change speed mechanically actuated friction clutches between said inner rotatable member and said shafts, all of said clutches being housed within said outer rotatable member, a change speed gear on each sleeve shaft, a cluster of gears permanently meshing with the gears on said sleeve shafts, speed controlled means comprising a set of centrifugally operated weights having cam faces, and means engaging said cam faces for automatically operating said change speed clutches in a predetermined order during the increase in speed of said driving shaft for driving said driven shaft from said driving shaft at different speed ratios.

14. In a change speed device, a driving shaft, a driven shaft, change speed mechanism including a plurality of auxiliary driven shafts and gears in permanent mesh between said driving and driven shafts for driving said driven shaft from said driving shaft, speed controlled means including clutch mechanism comprising driven clutch members movable with said driven shaft, driving clutch members movable with said auxiliary driven shafts, respectively, a plurality of oscillatable centrifugally operated cam members, means automatically operated by said cam members and engaging said driven clutch members for operating said clutches for automatically changing the speed ratio between said shafts without disengaging said gears, and manually operated means for disconnecting said driving from said driven shafts at will.

15. In a change speed mechanism, a driving shaft, a main driven shaft, a plurality of auxiliary driven shafts, change speed mechanism for driving said driven shafts from said driving shaft at different speed ratios, said mechanism including mechanically actuated clutch means comprising an outer rotating member rotatable with said driving shaft, a driven member rotatable with said main driven shaft, a driving clutch member on each of said auxiliary shafts, cooperating driven clutch plates on said driven member selectively operated from said auxiliary driven shafts, a service clutch between said rotatable member and one of said auxiliary shafts, means for manually operating said clutch, gears on said auxiliary driven shafts, a countershaft, gears on said countershaft meshing with the gears on said auxiliary shafts, and centrifugally operated means for automatically operating the driven clutch plates on said driven member operated by said auxiliary shafts and said gears to obtain progressively higher speeds of said driven shaft.

16. A change speed mechanism for use in motor vehicles comprising a driving shaft, a main driven shaft coaxially arranged with said driving shaft, sleeve shafts coaxial with said driven shaft, clutch mechanism between said driving and driven shafts, gear mechanism for operating said driven shaft from said driving shaft, said gear mechanism comprising gears carried by said driven and sleeve shafts, a countershaft, gears fixed on said countershaft and meshing with the gears on said sleeve shafts, a rear driven shaft, a clutch between said main and rear driven shafts for causing them to rotate together, a gear fixed on one element of said last-named clutch and meshing with a gear on said countershaft, speed controlled means including pivoted weight members having cam surfaces thereon for operating portions of said clutch mechanism for changing the speed ratio of said shafts, and manually operated means for disconnecting said shafts during the operation of said means.

17. In a change speed device, a driving shaft, a main driven shaft, a plurality of coaxial driven sleeve shafts, a change speed mechanism between said driving and driven shafts for driving said main driven shaft from said driving shaft at different speed ratios, said mechanism comprising a gear on each sleeve shaft, said gears having an increasing number of teeth from the gear on the outer sleeve to the gear on the inner sleeve, a countershaft having gears thereon, the gears on said sleeve shafts and on said countershaft being permanently in mesh, means including driving disk clutch plates carried by said sleeves, respectively, cooperating driven disk clutch plates movable with said main driven shaft, centrifugally operated pivoted weights having cam faces for selectively causing the engagement and disengagement of certain clutch plates for automatically changing the speed ratio between said driving and driven shafts for obtaining low, intermediate and high speeds for said main driven shaft without disengaging said gears, and a manually operated clutch for connecting or disconnecting said driving and main driven shafts at any speed.

JOSEPH M. HALL.
HERBERT E. TUCKER.